United States Patent [19]

Borodin

[11] 4,252,447

[45] Feb. 24, 1981

[54] PERISTALTIC BATCHER AND PERISTALTIC BATCHING SYSTEM REALIZED THEREWITH

[76] Inventor: Sergei I. Borodin, mikroraion "V", dom 31, kv. 38, Puschino, Moskovskoi oblasti, U.S.S.R.

[21] Appl. No.: 43,637

[22] Filed: May 30, 1979

[30] Foreign Application Priority Data

Jun. 23, 1978 [SU] U.S.S.R. .............................. 2634647
Mar. 21, 1979 [SU] U.S.S.R. .............................. 2733551

[51] Int. Cl.³ .................... B01F 11/00; B67D 5/30; B01F 5/12
[52] U.S. Cl. .................................. 366/349; 366/154; 222/14; 366/262; 417/474
[58] Field of Search ................ 366/349, 262, 69, 136, 366/142, 151, 152, 154, 162, 219; 417/474, 412, 510; 222/14, 15, 16, 17, 18, 19, 20, 21, 22

[56] References Cited

U.S. PATENT DOCUMENTS

| | | | |
|---|---|---|---|
| 2,412,397 | 12/1946 | Harper | 417/474 |
| 2,769,397 | 11/1956 | Bolger | 417/474 |
| 3,128,716 | 4/1964 | Stallman | 417/474 X |
| 3,429,266 | 2/1969 | Jones | 417/474 X |
| 3,773,300 | 11/1973 | Hauser | 366/349 |

*Primary Examiner*—Edward J. McCarthy
*Attorney, Agent, or Firm*—Burgess, Ryan and Wayne

[57] ABSTRACT

A peristaltic batcher comprises an elastic hose with a movable portion and immovable portions, passed between a roller and the shaft of an electric drive motor and carrying a squeezing means on one of its immovable portions. The roller and the shaft are connected by a means for transmitting counter-rotation from the shaft to the roller and permitting the distance between them to be changed. Connected to the drive for moving the roller and the squeezing means by a batching direction reversing switch, to the electric drive motor and to two transmitters indicating the terminal positions of the movable portion of the elastic hose is a reversing device of the control unit which also comprises a pulse-controlled cut-in switch connected with the reversing device, and a pulse-controlled cut-out switch. The peristaltic batching system is comprised of at least two tandem-connected peristaltic batchers.

10 Claims, 9 Drawing Figures

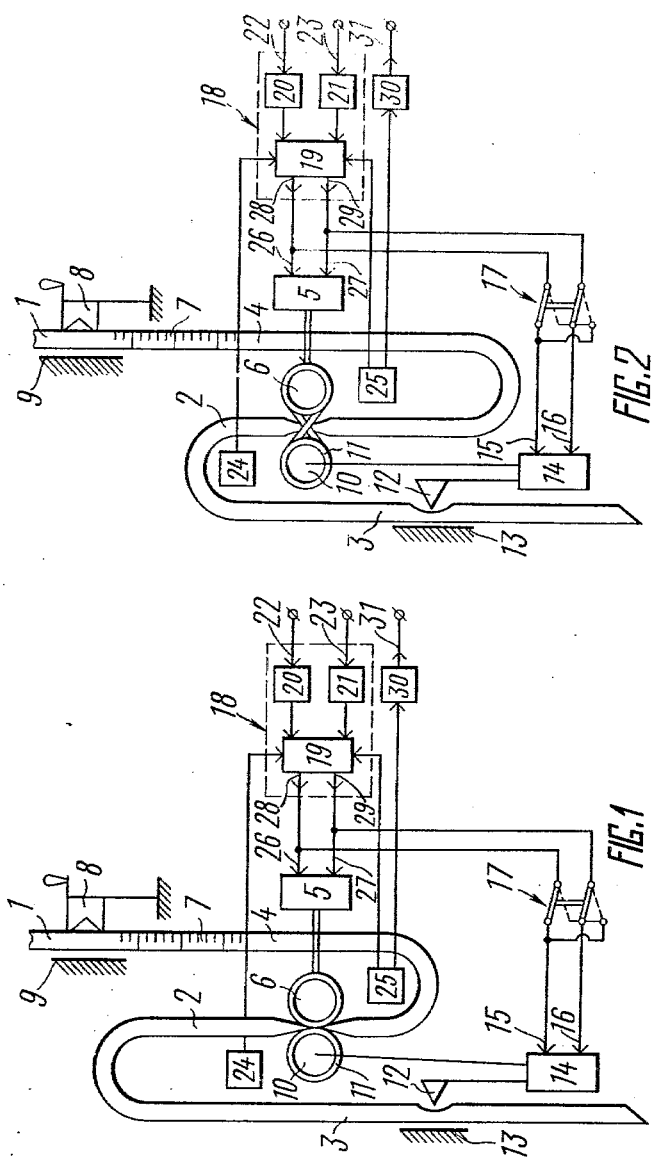

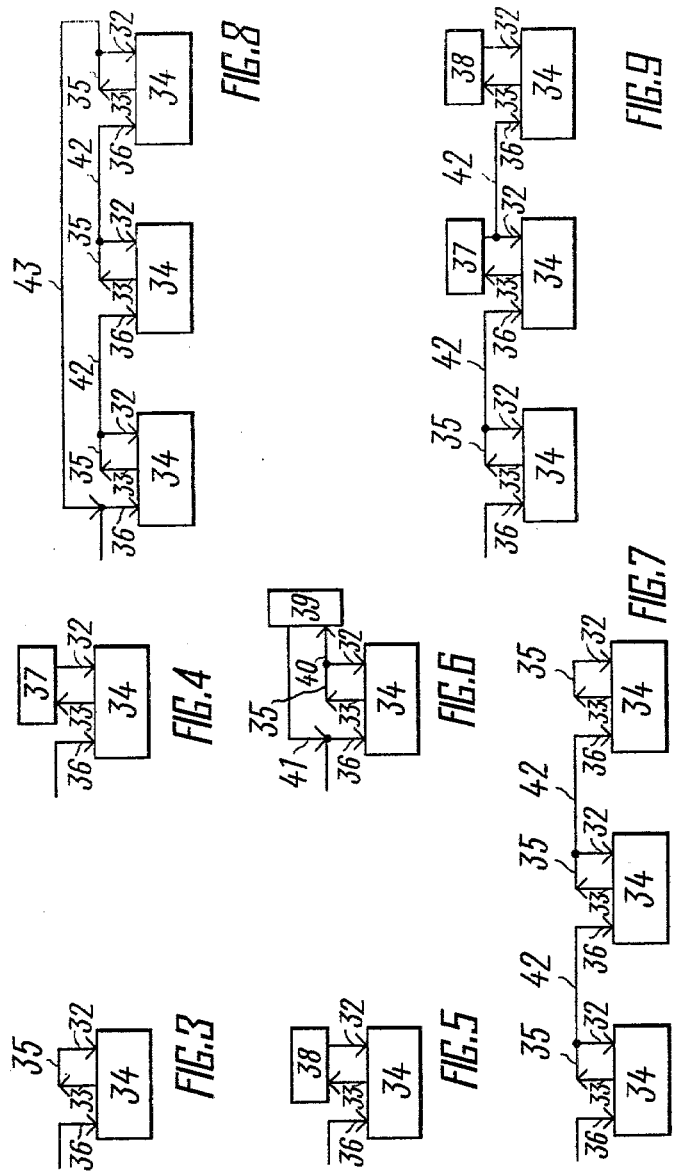

/ 4,252,447 /

PERISTALTIC BATCHER AND PERISTALTIC BATCHING SYSTEM REALIZED THEREWITH

FIELD OF APPLICATION

The present invention relates to batching devices and systems and more particularly it relates to peristaltic batchers and to peristaltic batching systems realized therewith.

The present invention can be utilized to advantage in scientific-research and applied-science laboratories dealing with biological, chemical and medical problems.

Besides, the present invention can be widely employed in public health institutions, chemopharmaceutical and microbiological industries, agriculture, and instrument building for discrete and sterile batching of gases, liquid media and media with solid inclusions.

BACKGROUND OF THE INVENTION

At present, batching is widely used in the laboratories of various brances of science and industry as a basic operation included into such processes as pipetting, mixing, diluting, sampling for analyses, fractionation, preparation of samples for analyses.

Known in the prior art is a peristaltic batcher (see Author's Certificate No. 570778 Int.Cl.$^2$ G01F 13/00, USSR) comprising an elastic hose with a movable portion and immovable portions, an electric drive motor with a shaft for rolling the movable portion of the elastic hose, a roller for pressing the movable portion of the elastic hose against the electric motor shaft, a squeezing means installed on one of the immovable portions of the elastic hose, a drive for moving the roller and the squeezing means, two transmitters indicating the terminal position of the movable portion of the elastic hose, and a control unit incorporating a reversing device connected electrically with the electric motor, with the drive and with the terminal position transmitters, and a pulse-controlled cut-in switch connected with the reversing device and having an input which serves as the starting input of the control unit. The elastic hose in this batcher is arranged in the shape of a single loop whose immovable portion passes between a clamp intended to change the size of the single loop, and a stop.

However, a rise of counterpressure of the handled medium in this batcher is accompanied by the growing resistance to the rolling of the hose so that it slips on the electric motor shaft whereby the reliability of batching is impaired.

Besides, this batcher can operate in one mode only, viz., in the single-batch mode in which the batcher discharges one single batch per each pulse delivered to the starting input, said single batch being directly proportional to the diameter and length of the rolled portion of the elastic hose which limits the batching range.

Besides, alternating discharge and suction batching required, say, in the process of pipetting calls in this batcher for exchanging the ends of the hose because this batcher is capable of working in one direction only which hampers its employment in laboratories.

Furthermore, the single-loop arrangement of the hose in this batcher creates a twisting force directed along the hose generatrix which increases the danger of small-diameter hose breaking contact with the electric motor shaft.

And, finally, the inward and outward movement of the elastic hose in the clamp of this batcher for changing the size of the single loop is not measured quantitatively, which hinders setting and correcting the size of a single batch.

BRIEF DESCRIPTION OF THE INVENTION

An object of the present invention resides in providing a peristaltic batcher ensuring higher batching reliability.

Another object of the present invention resides in widening the batching range of the peristaltic batcher.

Still another object of the present invention resides in improving the convenience of batcher operation in discharge and suction modes.

A further object of the present invention resides in reducing the probability of the small-diameter elastic hose breaking contact with the electric motor shaft.

And a still further object of the present invention resides in improving the convenience of setting and adjusting the size of a single batch.

This is achieved by providing a peristaltic batcher comprising an elastic hose with a movable portion and immovable portions, an electric motor with a shaft for rolling the movable portion of the elastic hose, a roller for pressing the movable portion of the elastic hose against the electric motor shaft, a squeezing means installed on one of the immovable portions of the elastic hose, a drive for moving the roller and the squeezing means, two transmitters indicating the terminal position of the movable portion of the elastic hose, and a control unit with a reversing device connected electrically with the electric motor, with the drive and with the terminal position transmitters, and a pulse-controlled cut-in switch connected with the reversing device and having an input which serves as the starting input of the control unit wherein, according to the invention, said batcher incorporates a means for transmitting counter-rotation from the shaft to the roller, said means embracing the shaft and the roller and allowing changes in the distances therebetween, a switch for changing the direction of batching by reversing the phase of movement of the roller and squeezing means, said switch being connected to the inputs of the drive and to the outputs of the reversing device, while the control unit comprises additionally a pulse-controlled cut-out switch which is connected to the reversing device and whose input serves as the stopping input of the control unit.

It is practicable that the batcher should comprise a pulse shaper whose input would be connnected to one of the terminal position transmitters and whose output would be connected electrically with the stopping input of the control unit.

It is also practicable that the electrical connection between the stopping input of the control unit and the output of the pulse shaper should be constituted by a counter with a regulatable coefficient of division of sequence of the input pulses and with a pulse shaped after a certain number of pulses.

Besides, it is practicable that the electrical connection between the stopping input of the control unit and the output of the pulse shaper should be constituted by a pulse delay device.

It is also practicable that the output of the pulse shaper should be connected to the input of an additional delay device whose output would be connected to the starting input of the control unit.

Furthermore, it is practicable that the elastic hose should be arranged in a zig-zag manner in one plane which reduces the probability of the elastic hose breaking contact with the electric motor shaft on changes in the distance between the roller and the shaft.

And, finally, it is highly practicable that there should be a system of peristaltic batching consisting of at least two tandem-connected peristaltic batchers.

The present invention provides for rolling an elastic hose with a larger area of friction adhesion which improves the reliability of batching.

Besides, the present invention permits batching in single and multiple batches which widens the batching range.

Furthermore, the present invention permits batching in an opposite direction which facilitates handling of the batcher.

In addition, the present invention eliminates the twisting force acting along the generatrix of the elastic hose which diminishes the probability of the small-diameter hose breaking contact with the electric motor shaft.

The present invention also permits quantitative assessment of the inward and outward movement of the elastic hose in the clamp for changing the length of rolling of the movable portion of the elastic hose which improves the convenience of setting and adjusting the size of a single batch.

Besides, the present invention permits multiple-component peristaltic batching on easily-varied programs which widens considerably the field of batcher application.

BRIEF DESCRIPTION OF THE DRAWINGS

Other objects and advantages of the present invention will be disclosed below by way of a concrete example with reference to the accompanying drawings in which:

FIG. 1 is a functional diagram of the peristaltic batcher in an initial position according to the invention;

FIG. 2 is a functional diagram of the peristaltic batcher at the end of discharge of a batch according to the invention;

FIG. 3 is a structural layout of the peristaltic batcher with a jumper for the single-batch operation mode according to the invention;

FIG. 4 is a structural layout of the peristaltic batcher comprising a counter with a regulatable coefficient of division of the sequence of input pulses and shaping a pulse at the output after a preset number of pulses for operation in multiple-batch mode according to the invention;

FIG. 5 is a structural layout of the peristaltic batcher incorporating a pulse time-delay device for operation in the multiple-batch mode according to the invention;

FIG. 6 is a structural layout of the peristaltic batcher according to FIG. 3 with an additional pulse delay device for operation in the mode ensuring regulation of the number of single batches per unit of time, according to the invention;

FIG. 7 is a structural layout of the peristaltic batching system realized on the base of the peristaltic batcher according to FIG. 3 for multiple-component single batch operation with a preset proportioning of components, according to the invention;

FIG. 8 is a structural layout of the peristaltic batching system realized on the base of the peristaltic batcher according to FIG. 3 for self-controlled multiple-component single-batch operation according to the invention;

FIG. 9 is a structural layout of the peristaltic batching system realized on the base of the peristaltic batchers shown in FIGS. 3, 4 and 5 for multiple-component single-batch and multiple-batch discharge and suction operation on a preset program, according to the invention

DETAILED DESCRIPTION OF THE INVENTION

The peristaltic batcher comprises an elastic hose 1 (FIG. 1) with a movable portion 2 and immovable portions 3 and 4 and an electric drive motor 5 with a shaft 6 for rolling the movable portion 2 of the hose 1. The hose is arranged in a zig-zag manner in one plane and provided with calibrating divisions 7 for setting the size of the batch. The immovable portion 4 of the hose 1 passes through a clamp 8 and a stop 9 which keep the hose 1 against uncontrollable motion. The shaft 6 is connected with a roller by a means 11 for transmitting counter-rotation from the shaft to the roller, said means permitting changing the distance between them and embracing the shaft 6 and the roller 10 (the means 11 will be referred to hereinafter as a drive belt 11, twisted through 180° midway between the shaft 6 and the roller 10). The movable portion 2 of the hose 1 passes between the shaft 6 and the roller 10 the distance between which at the point of rolling is governed by the thickness of the walls of the hose 1 in the position in which the internal passage of the hose 1 is completely squeezed up. The immovable portion 3 of the hose 1 passes between the squeezing means 12 and the stop 13. Connected to the roller 10 and to the squeezing means 12 is a drive 14 whose inputs 15 and 16 are connected to a switch for changing the direction of batching by reversing the phase of movement of the roller 10 and the squeezing means 12. The batcher comprises a control unit 18 having a reversing device 19 connected to which is a pulse-controlled cut-in switch 20 and a pulse-controlled cut-out switch 21 whose inputs serve, respectively, as the starting input 22 and stopping input 23 of the control unit 18, and transmitters 24, 25 of the terminal position of the movable portion of the elastic hose. The outputs 28 and 29 of the reversing device 19 are connected, respectively, to the inputs 26 and 27 of the electric drive motor 5 and, across the switch 17, to the inputs 15 and 16 of the drive 14. The transmitter 25 is connected to a pulse shaper 30 which has an output 31.

FIG. 2 shows a structural layout of the peristaltic batcher at the end of discharge of a batch. The roller 10 is withdrawn from the shaft over a distance at which the internal passage of the hose is half-squeezed, i.e. its passage area at this point is elliptical in shape (not shown in the drawing). The immovable portion 3 of the hose 1 is completely squeezed up by the means 12 on the stop 13 and the bend of the hose 1 acts on the transmitter 24 indicating the terminal position of the movable portion of the elastic hose.

In the single-batch operating mode the stopping input 23 of the control unit 18 and the output 31 of the pulse shaper 30 which serve, respectively, as the stopping input 32 (FIG. 3) and the output 33 of the batcher 34, are interconnected by a jumper 35. In this case the starting input 22 (FIG. 1) of the control unit 18 serves as the starting input 36 (FIG. 3) of the batcher 34.

In the multiple-batch operating mode there is a counter 37 cut in between the stopping input 32 (FIG. 4) and the output 33 of the peristaltic batcher 34, said counter having a regulatable coefficient of division of the sequence of the input pulses and shaping a pulse after a certain number of pulses, said counter being included into the peristaltic batcher 34.

In another version of multiple-batch operating mode, there is a pulse delay device 38 cut in between the stopping input 32 (FIG. 5) and the output 33 of the peristaltic batcher 34, said device being included into the peristaltic batcher 34.

In the batching mode with regulation of the number of batches per unit of time, an additional pulse delay device 39 is connected by its input 40 to the stopping input 32 (FIG. 6) of the peristaltic batcher, while its output 41 is connected to the starting input 36 of the batcher 34, said additional pulse delay device being also included into the peristaltic batcher 34.

The present invention also covers a peristaltic batching system consisting of three peristaltic batchers 34 according to the invention (FIG. 7) realized in accordance with FIG. 3. The jumpers 42 combine the stopping input 32 of the preceding batcher 34 with the starting input 36 of the following batcher 34.

When the peristaltic batching system operates in the self-controlled batching mode, the output 33 (FIG. 8) of the third peristaltic batcher 34 is connected with the input 36 of the first batcher by a jumper 43.

The present invention also discloses a peristaltic batching system consisting of three consecutively connected peristaltic batchers 34 according to the invention (FIG. 9) realized in accordance with FIGS. 3, 4 and 5. The jumpers 42 (FIG. 9) are connected similarly to the diagram shown in FIG. 7.

Let us consider the functioning of the peristaltic batcher in the continuous discharge batching mode.

In the initial position the hose 1 (FIG. 1) is filled with the material which cannot flow out because the internal passage (not shown) of the hose 1 is completely squeezed up by the roller 10 on the shaft 6. The batching direction changeover switch 17 is set for discharge in which position the outputs 28 and 29 of the reversing device 19 are connected, respectively, across the switch 17, with the inputs 15 and 16 of the drive 14.

As a pulse is delivered to the input 22 of the control unit 18 which serves as the starting input of the batcher, the pulse-controlled cut-in switch 20 in the control unit 18 sets in operation the electric drive motor 5 and the drive 14 via the reversing device 19. The electric drive motor 5 starts rolling the movable portion 2 of the hose 1 in the completely squeezed state downward (relative to the plane of the drawing) by means of the shaft 6 and roller 10 which is rotated by the drive belt 11 contrary to rotation of the shaft 6. As a result, the handled material contained in the hose 1 is forced outside through its immovable portion. Simultaneously, a new portion of the batched material is sucked in through the immovable portion 4 of the hose 1.

As soon as the transmitter 24 (FIG. 2) is acted upon by the approaching bend of the hose 1, said transmitter 24 sends a signal to the reversing device 19 and the latter reverses the electric drive motor 5 and the drive 14. The drive 14 squeezes up completely the immovable portion 3 of the hose 1 by the squeezing means 12 on the stop 13 and withdraws the roller 10 from the shaft 6 to a distance ensuring half-squeezing of the hose 1 in the space between them. Then the electric drive motor 5 starts rolling the half-squeezed hose in the opposite direction. The half-squeezed elastic hose retains the lateral resilience which is sufficient for its frictional rolling by the shaft 6 and roller 10; at the same time the internal passage of the hose 1 at the point of rolling retains constantly its elliptical shaps which permits the batched material to move together with the movable portion 2 of the hose 1.

As soon as the transmitter 25 (FIG. 1) is acted upon by the bend of the hose 1, it sends a signal to the reversing device 19 which again reverses the electric drive motor 5 and the drive 14. The drive 14 brings the roller 10 closer to the shaft 6, thereby squeezing up completely the hose 1 and withdraws the squeezing means 12 away from the stop 13, thereby half-squeezing the hose 1 on the immovable portion 3.

The electric drive motor 5 starts again to roll the movable portion 2 of the hose 1 in the completely squeezed state, moving it down and discharging again a new portion of the handled material after which the entire process is repeated cyclically over again until the batcher is stopped.

To stop the batcher, a pulse is sent to the stopping input 23 of the control unit 18 which serves as the stopping input of the batcher.

As a result, the pulse-controlled cut-out switch 21 cuts off the electric motor 5 and the drive 14 via the reversing device 19.

Thus, the peristaltic batcher pumps the handled material by separate portions from the top down (on the plane of the drawing) for discharge.

The batching capacity in this operating mode is directly proportional to the inside diameter of the installed hose 1, to the length of the rolled portion 2, and the rolling speed. The volume of the handled material is directly proportional to the batching time.

Operation of the peristaltic batcher in the continuous suction batching mode (from bottom up relative to the plane of the drawing) is basically similar to the above-described discharge batching mode. The sole difference lies in that the switch 17 (FIGS. 1, 2) for reversing the batching direction must be set in advance to the position shown by dotted lines. With the switch 17 in this position the outputs 28 and 29 of the reversing device 19 are connected across the switch 17 with the inputs 16 and 15, respectively, of the drive 14. After a pulse has been received at the input 22 (FIG. 2), the drive 14 withdraws the roller 10 from the shaft 6 to a half-squeezing distance and the hose is rolled down by the drive motor 5 in a half-squeezed state. This, in turn, causes the peristaltic batcher to perform suction.

In the single-batch operation mode the peristaltic batcher functions as follows.

As a pulse is sent to the starting input 36 (FIG. 3) of the batcher, the latter starts operating depending on the position of the switch 17 (FIGS. 1, 2) either for discharge or suction. At the moment of returning to the initial position after the discharge of the first portion of the batched material (single batch), the bend of the hose 1 (FIG. 1) acts on the transmitter 25 and the corresponding signal is delivered to the pulse shaper 30. From the pulse shaper 30 the pulse passes through the output 31 which serves as the output 33 (FIG. 3) of the batcher and through the jumper 35 to its stopping input 32 and the batcher stops of itself. Thus, each pulse sent to the starting input 36 causes the batcher 34 to discharge one single batch, which is directly proportional to the inside diameter of the installed hose 1 (FIGS. 1, 2) and the length of rolling of its movable portion 2 which can be adjusted by retracting or extending the hose 1 in the clamp 8 and thus setting the required size of the batch by the calibrated divisions 7.

In the multiple-batch operating mode the peristaltic batcher functions as follows.

As a pulse is delivered to the starting input 36 (FIG. 4) of the batcher 34, the latter begins operating depending on the position of the switch 17 (FIGS. 1, 2) either for discharging or for suction. After discharging each individual batch at the moment when the hose 1 (FIG. 1) returns to the initial position, the pulse shaper 30 shapes a pulse. These pulses pass from the output 33 (FIG. 4) to the counter 37 with a regulatable coefficient of division of the sequence of input pulses and with a pulse shaped after a certain number of pulses, and are summarized by said counter. As soon as the number of pulses reaches the figure set on the counter 37, a pulse from the counter output passes to the stopping input 32 of the batcher 34 and the discharge of the multiple batch is stopped. Thus, on each pulse delivered to the input 36 the batcher 34 discharges one multiple batch consisting of individual batched whose number can be set on the counter 37.

In the multiple-batch operating mode with time control the peristaltic batcher functions as follows.

As a pulse is fed to the starting input 36 (FIG. 5) of the batcher 34, the latter starts pumping the material handled depending on the position of the switch 17 (FIGS. 1, 2) either for discharge or for suction. After discharging the first single batch, a pulse is sent from the output 33 (FIG. 5) to the pulse delay device 38. The device 38 delays this pulse for a preset time while the batcher 34 keeps pumping the handled material. When the time of pulse delay expires, the pulse is sent from the output of the pulse delay device 38 to the stopping input 32 of the batcher 34 and the discharge of the multiple batch is discontinued. Thus, for each pulse fed to the input 36, the batcher 34 delivers one multiple batch consisting of individual batches whose number is directly proportional to the pulse delay time set on the device 38 (plus-minus one single batch because the delay time may end at any moment of the single batch discharge cycle).

In the batching mode ensuring the possibility of controlling the number of single batches per unit of time the peristaltic batcher functions as follows.

As a pulse is sent to the starting input 36 (FIG. 6), the batcher 34 delivers one single batch because the pulse passes from the output 33 through the jumper 35 to the stopping input 32 and the batcher stops of itself. Concurrently, the pulse passes from the output 33 to the input 40 of the additional pulse delay device 39. On expiration of the pulse delay time set on the device 39, the pulse passes from its output 41 to the starting input 36 of the batcher 34 thus starting said batcher again. Then the entire above-described cycle will be repeated until the output 41 of the device 39 is disconnected from the starting input 36. Thus, it is enough to start the batcher 34 only once by the pulse sent to the starting input 36 after which it will go on working automatically and batching the material at the output which is inversely proportional to the delay time set by the device 39.

For the single-batch multiple-component operation at a preset ratio, a system of peristaltic batching is used, composed of three peristaltic batchers 34 (FIG. 7).

As a pulse is sent to the starting input 36 of the first batcher 34 (L.H. batcher in the plane of the drawing), said batcher discharges one single batch of the first batched component. After discharging the single batch, the first batcher 34 stops itself and, simultaneously, starts the second batcher 34 through the jumper 42; after discharging a single batch of the second component the second batcher also stops itself and simultaneously starts the third batcher 34. After discharging the third component the cycle of the preset multiple-component batching ceases. Thus, for each pulse delivered to the input 36 of the first batcher 34, the system discharges single batches in a preset sequence and in the ratio determined by the sizes of single batches set on the batchers 34.

The automatic multiple-component single-batch operation with a preset ratio of components, is performed by the perstaltic batching system shown in FIG. 8.

As a pulse is sent to the starting input 36 of the first batcher, the system operates just as it is described in the preceding mode of operation. After the single batch has been discharged by the third batcher 34 (R.H. batcher in the plane of the drawing), the latter stops itself and, acting through the jumper 43, restarts the first batcher 34 through its starting input 36. Thus, once being started, the system goes on working automatically and continuously until one of the jumpers 42 or 43 is disconnected.

For operation in the single-batch or multiple-batch multiple-component batching mode according to a preset program for discharge or suction, a system is used comprising three batchers 34 according to the invention (FIG. 9).

When a pulse is sent to the starting input 36 of the first batcher 34 (L.H. batcher in the plane of the drawing), the latter discharges one single batch of the first component. Then the second batcher 34 steps in and discharges the second component in the form of a multiple batch whose size is set on the counter 37. Then the third batcher 34 starts operating (this batcher can be shifted over, for example, to the suction mode by the switch 17, FIGS. 1, 2). Then the third batcher 34 (FIG. 9) will suck the mixture consisting of two components and discharge it to the assigned location. If the delay time on the device 38 is set to exceed considerably the delay required for sucking the mixture prepared by the first and second batchers 34, the third batcher 34 will ensure additional blowing of the passage (not shown in the drawing) through which said mixture is conveyed.

The present invention makes it possible to use the peristaltic batchers for a variety of purposes.

What is claimed is:

1. A peristaltic batcher comprising:
   an elastic hose arranged in a zig-zag manner in one plane and having an external surface, a movable portion, a first immovable portion and a second immovable portion;
   calibrated divisions for setting the size of the batch, made on said external surface of said elastic hose;
   a first stop supporting said first immovable portion of said elastic hose;
   clamp for preventing the possibility of uncontrollable movement of said first immovable portion of said elastic hose, installed opposite said first stop;
   a second stop supporting said second immovable portion of said elastic hose;
   a squeezing means installed opposite said second stop;
   an electric drive motor having a shaft for rolling said movable portion of said elastic hose and the first and second inputs;
   a roller for pressing said movable portion of said elastic hose against said shaft of said electric drive motor;
   a means for transmitting counter-rotation, connecting said roller with said shaft of said electric drive motor, and permitting the distance between them to be changed;

a drive for moving said roller and said squeezing means and having the first and second inputs;

a first transmitter of the terminal position of said movable portion of said elastic hose installed between the zigzag of said movable portion of said elastic hose and having an output;

a second transmitter of the terminal position of said movable portion of said elastic hose installed between the zigzags of said movable portion of said elastic hose and having the first and second outputs;

a control unit having the first input, second input, starting input, stopping input, first and second inputs and connected by its first and second inputs to said output and to the second output of the respectively mentioned first and second terminal position transmitters of said movable portion of said elastic hose;

a reversing device of said control unit having the first and second inputs which serve respectively as said first and second inputs of said control unit, the third and fourth inputs and the first and second outputs which serve, respectively, as said first and second outputs of said control unit;

a pulse-controlled cut-in switch of said control unit, having an input which serves as said starting input of said control unit, and an output and connected by said output to said third input of said reversing device;

a pulse-controlled cut-out switch of said control unit having an input which serves as said stopping input of said control unit, and an output, and connected by said output to said fourth input of said reversing device;

a changeover switch for changing the batching direction by reversing the phase of movement of said roller and said squeezing means, connected between said inputs of said drive and said outputs of said reversing device.

2. A batcher according to claim 1 comprising:

a pulse shaper having an input and an output and connected by its input to said first output of said second transmitter of the terminal position of said movable portion of said elastic hose and electrically connected by its output with said stopping input of said control unit.

3. A batcher according to claim 2 comprising a counter with a regulatable coefficient of division of the sequence of input pulses and shaping a pulse after a certain number of pulses, having an input and an output and connected by its input to said output of said pulse shaper, while its output is connected to said stopping input of said control unit.

4. A batcher according to claim 2 comprising a first pulse delay device having an input and an output and connected by its input to said output of said pulse shaper, and by its output to said stopping input of said control unit.

5. A batcher according to claim 2 comprising a pulse delay device having an input and an output and connected by its input to said output of said pulse shaper and by its output to said starting input of said control unit.

6. A batcher according to claim 3 comprising a pulse delay device having an input and an output and connected by its input to said output of said pulse shaper and by its output to said starting input of said control unit.

7. A batcher according to claim 4 comprising a second pulse delay device having an input and an output and connected by its input to said output of said pulse shaper and by its output to said starting input of said control unit.

8. A peristaltic batching system comprised of at least two tandem-connected peristaltic batchers, each consisting of:

an elastic hose arranged in a zigzag manner in one plane and having an external surface, a movable portion, a first immovable portion and a second immovable portion;

calibrated divisions for setting the size of the batch, made on said external surface of said elastic hose;

a first stop supporting said first immovable portion of said elastic hose;

a clamp for preventing uncontrollable movement of said first immovable portion of said elastic hose, installed opposite said first stop;

a second stop supporting said second immovable portion of said elastic hose;

a squeezing means installed opposite said second stop;

an electric drive motor having a shaft for rolling said movable portion of said elastic hose, and the first and second inputs;

a roller for pressing said movable portion of said elastic hose against said shaft of said electric drive motor;

a means for transmitting counter-rotation, connecting said roller with said shaft of said electric drive motor and changing the distance therebetween;

a drive for moving said roller and said squeezing means and having the first and second inputs;

a first transmitter of the terminal position of said movable portion of said elastic hose installed between the zigzag of said movable portion of said elastic hose and having an output;

a second transmitter of the terminal position of said movable portion of said elastic hose, installed between the zigzags of said movable portion of said elastic hose, and having the first and second outputs;

a control unit having the first input, second input, starting input, stopping input, first and second outputs and connected by said first and second inputs to said output and second output, respectively, of said first and second transmitters of the terminal position of said movable portion of said elastic hose;

a reversing device of said control unit having the first and second inputs which serve, respectively, as said first and second inputs of said control unit, the third and fourth inputs and the first and second outputs which serve, respectively, as said first and second outputs of said control unit;

a pulse-controlled cut-in switch of said control unit, having an input which serves as said starting input of said control unit, and an output, and connected by its output to said third input of said reversing device;

a pulse-controlled cut-out switch of said control unit having an input which serves as said stopping input of said control unit, and an output, and connected by its output to said fourth input of said reversing device;

changeover switch for changing the batching direction by reversing the phase of movement of said roller and said squeezing means, connected between said inputs of said drive and said outputs of said reversing device;

a pulse shaper having an input and an output and connected by its input to said first output of said second transmitter of the terminal position of said movable portion of said elastic hose and connected electrically by its output with said stopping input of said control unit.

9. A system according to claim 8 wherein each of said peristaltic batchers comprises a counter with a regulatable coefficient of division of the sequence of input pulses, shapes a pulse after a certain number of pulses, has an input and an output and is connected by its input to said output of said pulse shaper and by its output to said stopping input of said control unit.

10. A system according to claim 8 wherein each of said batchers comprises a pulse delay device having an input and an output and connected by its input to said output of said pulse shaper and by its output to said stopping input of said control unit.

* * * * *